United States Patent [19]

Kachik et al.

[11] 4,131,473

[45] Dec. 26, 1978

[54] METHOD OF FORMING A HIGH-TEMPERATURE ABRASION-RESISTANT COATING ON A FERROUS METAL SUBSTRATE, AND RESULTING ARTICLE

[75] Inventors: Robert H. Kachik, Washington Township, Westmoreland County; Arthur J. Pignocco, Franklin Township, Westmoreland County, both of Pa.

[73] Assignee: United States Steel Corporation, Pittsburgh, Pa.

[21] Appl. No.: 503,202

[22] Filed: Sep. 4, 1974

Related U.S. Application Data

[62] Division of Ser. No. 332,987, Feb. 15, 1973.

[51] Int. Cl.² ............................................. C09D 5/38
[52] U.S. Cl. .............................. 106/1.12; 106/38.27; 427/192

[58] Field of Search ............... 106/1, 38.2, 38.22, 106/38.23, 38.27, 38.9, 1.12; 427/422, 423, 192; 164/53, 54

[56] References Cited

U.S. PATENT DOCUMENTS

| 1,596,888 | 8/1926 | Pacz | 164/54 |
| 2,337,314 | 12/1943 | Deppeler | 75/27 |
| 2,798,818 | 7/1957 | Pletsch et al. | 164/53 |
| 3,867,155 | 2/1975 | Davis et al. | 106/38.27 |

FOREIGN PATENT DOCUMENTS 673605  6/1952  United Kingdom ..................... 164/53

*Primary Examiner*—Lorenzo B. Hayes
*Attorney, Agent, or Firm*—Forest C. Sexton

[57] ABSTRACT

A method of forming a high-temperature abrasion-resistant hard facing or coating on a ferrous metal substrate by employing an aluminothermic reduction reaction. The resultant article has a hard facing layer containing from 2 to 8 percent boron. Hard faced composite articles made by the invented method, such as sintering machine crash decks, coke pusher ram shoes and grizzly bars are also disclosed.

4 Claims, 9 Drawing Figures

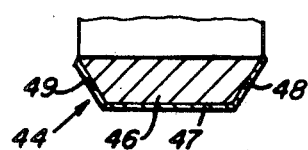
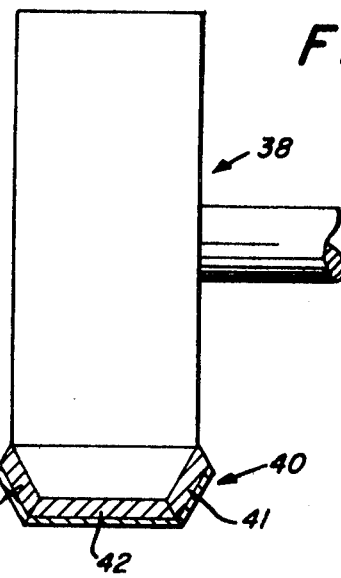
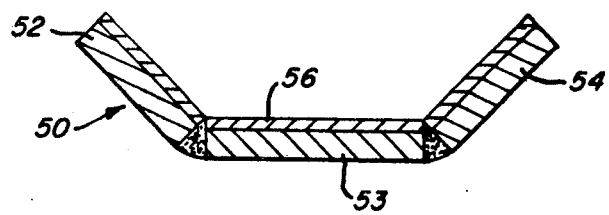
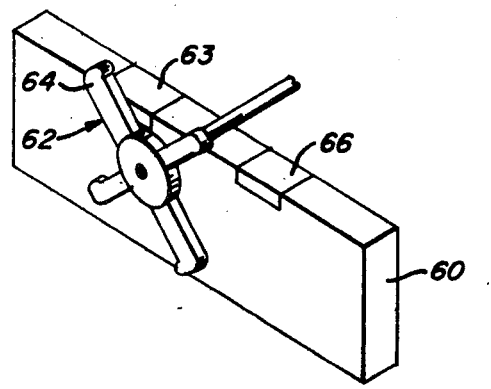

METHOD OF FORMING A HIGH-TEMPERATURE ABRASION-RESISTANT COATING ON A FERROUS METAL SUBSTRATE, AND RESULTING ARTICLE

This is a division, of application Ser. No. 332,987, filed Feb. 15, 1973.

This invention relates to ferrous metal articles, each having a thick layer of a high-temperature, abrasion-resistant alloy material tightly bonded to its surface. More particularly this invention relates to articles, such as sintering machine crash decks, coke pusher ram shoes, chutes an grizzly bars, which require a wearing surface which is resistant to abrasion at high temperatures, that is, temperatures between about 900° F. and 1600° F.

Many steel alloys possess the necessary strength to withstand considerable stress. However, these alloys are often deficient in resistance to erosion or wear when encountered in their intended service. To provide the proper wear resistance, these steels are often coated or "hard faced" with wear-resistant materials. High temperature service introduces such mechanical and metallurgical variables into the hard facing materials that they no longer perform satisfactorily. As a result, only a few of the more conventional hard facing alloys are satisfactory for such high temperature service, notably cobalt-based, nickel-based or austenitic-nickel-iron alloys. Unfortunately, these hard facing alloys are extremely expensive and time consuming to apply.

Steels boronized by various techniques including pack cementation and chemical vapor deposition possess extremely high resistance to erosion. Coatings applied by these techniques generally are quite thin, ranging in thickness from 0.001 to 0.0001" thick. To increase the thickness of such coatings requires considerable effort. Boronizing methods are described in U.S. Pats. 3,029,162 and 3,622,402. These methods are extremely slow and require the use of chambered furnaces or retorts and generally do not lend themselves to the boronizing of large objects, such as sintering machine crash decks. Further such coatings are unsuited for high impact applications because they are too thin and are extremely brittle.

We are aware of the following prior art concerning aluminothermic welding processes:

| Carpenter et al. U.S. Pat. | 2,515,191 |
| Funk U.S. Pat. | 3,264,696 |
| Funk U.S. Pat. | 3,396,776 |
| Guntermann U.S. Pat. | 3,421,570 |

We have discovered a method of facing crash decks and other objects subject to extreme wear from high temperature, high abrasion uses, by metallurgically bonding a unique ferroboron hard facing to a ferrous metal substrate by a rapid and relatively inexpensive aluminothermic reduction (ATR) deposition method. We have found that when from about 2 to about 8 weight percent of boron is present in the final outer surface of the composite that surface is hard and wear resistant. Unexpectedly, the wear resistance remained good at elevated temperatures, i.e., 1,000 to 1,600° F.

It is the primary object of the subject invention to provide a ferrous metal article having a wear resistant surface for use at elevated temperatures at which it is subject to high abrasion from impact or sliding friction.

It is another object of our invention to provide a method for making such an article.

It is also an object to provide an ATR bonding method which requires no cleaning of the substrate prior to emplacement of the ATR charge, and no special igniter material in the charge.

It is also an object to provide an improved sintering machine crash deck.

It is also an object to provide an improved coke pusher ram shoe.

It is also an object to provide a coke chute.

It is also an object to provide an improved grizzly bar.

In the drawings:

FIG. 6 is a partially cross-sectioned side view of a coke pusher ram and shoe.

FIG. 7 is a cross-sectioned side view of an alternative coke pusher ram shoe.

FIG. 8 is a cross-section of a hard faced chute for hot granular material.

FIG. 9 is an isometric view of a grizzly bar for a hot sinter breaking application.

Figure 1:
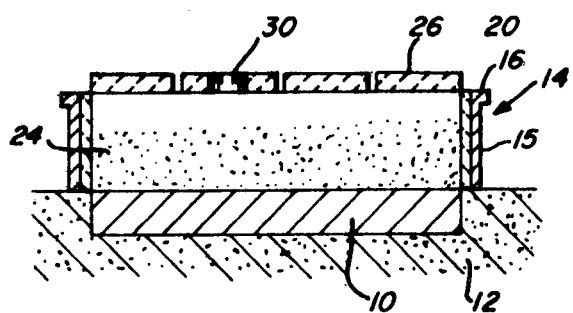
FIG. 1 is a sectioned elevational view of a refractory-lined perimeter and the necessary materials properly disposed for carrying out the method of the invention.
Figure 2:
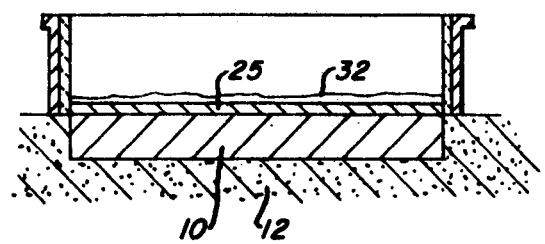
FIG. 2 is a cross-sectioned elevational view similar to FIG. 1 taken after the aluminothermic reduction reaction of the subject method has taken place.

As shown in FIG. 1, a steel substrate 10 is placed on a bed of sand 12, and the level of the sand is brought up to the level of the upper surface of the substrate. A refractory-lined perimeter 14 comprising a steel exterior with flanges 16 for crane hooks and a refractory lining 20, which is in this case graphite, has an interior dimension identical to the exterior dimensions of the steel substrate. The perimeter is positioned on the sand base 12 surrounding the substrate. An aluminothermic reduction charge or mixture 24 is placed within the perimeter on the substrate to a generally uniform depth of at least about ½-inch and up to a depth of about 12 inches. The resulting hard facing layer 25 will have a thickness about 1/6 the average depth of the original powdered charge. The charge consists of about three parts powdered iron oxide, which is preferably $Fe_2O_3$ but can be $Fe_3O_4$, preferably having a size at least as fine as −35 mesh, one part aluminum powder preferably having a size between about −20 mesh and +325 mesh, and sufficient ferroboron to provide from 2 to 8% boron in the final hard facing composition. The ferroboron is added in the form of crushed pellets, preferably having a size of −20 mesh. The composition range of the basic ATR charge is 65 to 85 parts iron oxide and 15 to 35 parts aluminum. Stoichiometric amounts are ordinarily used, but we have employed up to 5% excess of either component with good results.

Optionally, refractory plates, such as graphite plates 26 shown in FIG. 1, are placed atop the refractory perimeter. One of the plates is provided with a hole 30 through which the charge is ignited. These refractory plates prevent splashing, contain the heat of reaction of the charge and force such heat into the substrate to enhance the adherence of the hard facing 25. The charge 24 is ignited by a convenient means, such as a welding torch inserted in the hole which ignites the fuel powder, in this case aluminum. Other fuels that might be used instead of aluminum are magnesium, calcium, silicon and calcium silicon alloy. These fuels may replace only a portion of the aluminum powder, if desired. The reaction is very exothermic which produces products having a high degree of superheat from which the dense metal phase separates and metallurgically bonds to the substrate 10. The less dense slag layer 32 collects on top of the metal phase. After the reaction is complete, the graphite plates 26 are removed from atop the refractory perimeter and the product is insulated. Insulation (not shown) is provided by placing a blanket of Kaowool or pouring sand on top of the slag crust. This causes the metal to solidify from the bottom and promote a sound, pore-free hard facing 25. The product is allowed to cool until the hard facing has solidified at which time the insulation and the perimeter can be removed. The slag 32 is removed merely by breaking it to leave a ferrous metal substrate 10 having a boron-containing abrasion-resistant surface 25. Heretofore, the surface of any substrate clad by an aluminothermic reaction has been required to be cleaned as shown in Funk Patent No. 3,264,696; however, we have found surface preparation of the substrate to be totally unnecessary.

Figure 5:
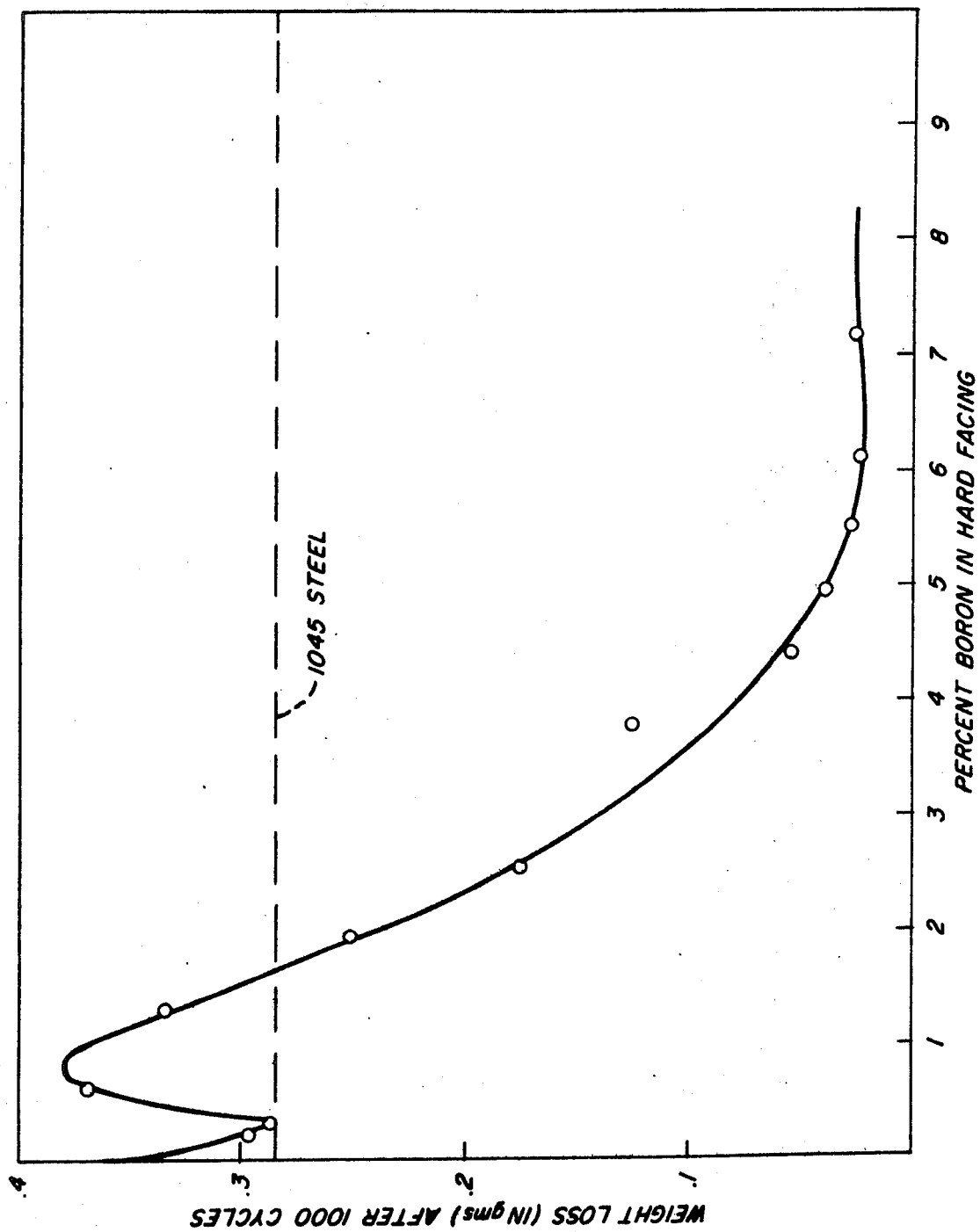
FIG. 5 is a graph comparing the wear resistance of the ferroboron alloy of our hard facing as a function of the percentage of boron in the hard facing.

As can be seen by the graph of FIG. 5, when less than about 1½% boron is present in the hard facing, it has no better wear resistance than regular 1045 grade steel. Additional boron in the hard facing increases the wear resistance until the maximum wear resistance is obtained from a boron content of approximately 5.5%. The curve levels out thereafter and there is no advantage in adding boron in any amount above 7 or 8%. Additional boron merely increases the cost without an attendant increase in wear resistance, and also makes the hard facing more brittle. Thus, while 1½ to 8% boron is within the purview of our invention, we prefer 4 to 7% boron with the optimum boron level being 5.5 to 7%.

Heretofore it has been known that diffusion of boron into ferrous surfaces enhances wear resistance by hardening the outer layer. It is also known that a ferroboron coating can be applied to ferrous surfaces by flame or plasma spraying. Prior to our invention, however, the maximum thickness of such ferroboron coastings has been limited to about 1 mil.

We form a ferroboron hard facing which consists of an iron-base matrix containing from about 20 to 90 volume percent of $Fe_2B$, preferably 45 to 80 volume percent of $Fe_2B$, with the optimum range of 60 to 80 volume percent of $Fe_2B$. This hard facing has a minimum thickness of about 0.1 inch and preferably is not less than 0.25 inch. We can form hard facings two inches thick or more by our method.

While in our preferred embodiment an iron-base matrix containing $Fe_2B$ is formed on a ferrous metal substrate, we can form hard facing layers of any matrix-forming metal or alloy on most metallic substrates. Copper, tin, nickel, chromium, cobalt and molybdenum as well as brass, bronze, ferrous and non-ferrous alloys and stainless steels are all suitable substrates.

The substrate should be preheated prior to placing it on the sand base. While the substrate can be preheated to any temperature below its fusion point, we prefer to preheat to within the range of 1400° to 2000° F., with an optimum temperature of 1800° F.

Figure 4:
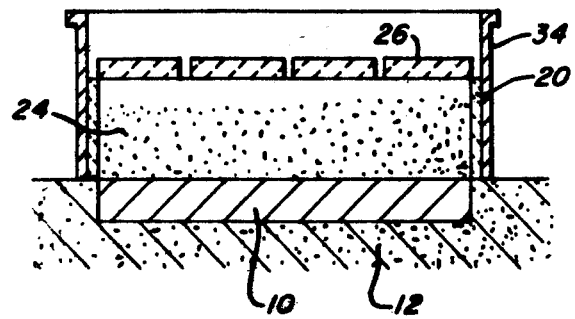
FIG. 4 is a cross-sectioned elevational view similar to FIG. 1 showing an alternative configuration for a refractory-lined perimeter.

An alternative perimeter configuration is shown in FIG. 4. The sides 34 extend above the height of the graphite lining 20. This provides a better seat for plates 26.

Figure 3:
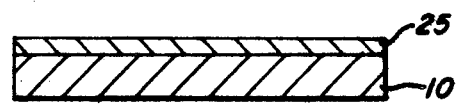
FIG. 3 is a cross-sectioned elevational view of the composite product of our invention.

A sintering plant crash deck is formed of a composite as shown in FIG. 3 which is suspended, usually at an angle, for hot sinter to fall on and slide down toward a breaker. Sintering plant operation requires such crash decks to withstand abrasion at temperatures generally about 1200° F. A crash deck or other composite having a hard facing comprising a stainless steel matrix containing an effective amount of $Fe_2B$ will be both corrosion resistant and abrasion resistant.

A coke pusher ram 38 is shown in FIG. 6, which has a ram shoe 40 comprising three composite plates 41, 42 and 43, hard faced in accordance with the invented method. Since the coke pusher ram moves along the bottom of a hot coke oven to push out the coke, the hard facing is on the bottom of the shoe where the wear resistance is most urgently required.

An alternative coke pusher ram shoe 44, as shown in FIG. 7, has a ferrous metal substrate 46, beveled at each end. The bottom 47 is first hard faced, then beveled edges 48 and 49 are hard faced either in turn or simultaneously using a special perimeter.

A chute 50 for hot granulated material, such as coke or sinter, is shown in FIG. 8. Three elongated plates 52, 53 and 54 are hard-faced and welded longitudinally to form a chute with the hard facing 56 on the inside or wearing surface.

FIG. 9 shows a grizzly bar 60 for a sintering plant rotary breaker 62. We form a hard facing 63 at the point of greatest wear, beneath the breaker arm 64, and at 66, so the grizzly bar can be turned around to double its useful life. Alternatively, the entire upper surface of the bar can be hard faced.

It is possible to form our hard facing on a substrate having an inclined or curved surface by using special perimeter (or mold) configuration.

Our invention comprehends the hard facing composition comprising exothermic reaction mixture of an exothermic fuel powder, such as aluminum or other fuels named hereinbefore, a particulate matrix-forming material comprising a reducible oxide of at least one matrix-base metal, such as $Fe_2O_3$ or $Fe_2O_3$ and $Cr_2O_4$ (which will form a stainless steel matrix), and an effective amount of boron (boric oxide or ferroboron, preferably as FeB) sufficient to impart the desired abrasion resistance to the resulting hard facing layer.

It can readily be seen from the foregoing that we have invented a method for cladding a metal article with a high-temperature, abrasion-resistant hard face. We have also invented a high-temperature, abrasion-resistant sintering machine crash deck, a high-temperature, abrasion-resistant coke pusher ram shoe, a high-temperature, abrasion-resistant grizzly bar, and a high-temperature, abrasion-resistant chute for hot granular material.

We claim:

1. A composition mixture for exothermically depositing a hard facing metallic layer onto a metallic substrate, consisting essentially of an exothermic fuel powder selected from the group consisting of aluminum, magnesium, calcium, silicon, and mixtures thereof; a particulate matrix forming material selected from the group consisting of $Fe_2O_3$, $Fe_3O_4$, $Cr_2O_3$ and mixtures thereof; and a boron containing material selected from the group consisting of boric oxide, ferroboron and mixtures thereof in an amount sufficient to yield from 4 to 7% boron in the hard facing metallic layer.

2. A composition mixture according to claim 1 in which said boron containing material is in an amount sufficient to yield from 5 to 7% boron in the hard facing metallic layer.

3. A composition mixture according to claim 1 in which said exothermic fuel powder is aluminum.

4. A composition mixture according to claim 2 in which 15 to 35 parts of aluminum is present with 65 to 85 parts of matrix forming material.

* * * * *